May 9, 1939. J. MERCIER 2,157,963
RETRACTABLE LANDING GEAR FOR AIRPLANES
Filed Dec. 29, 1936
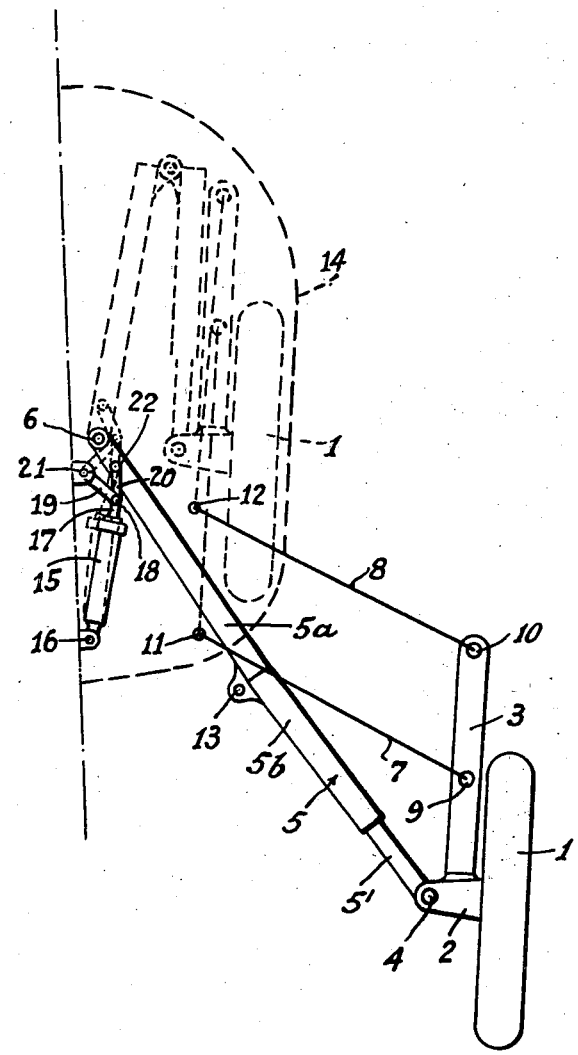
Inventor.
Jean Mercier
By B.Linger, Atty Patented May 9, 1939

2,157,963

UNITED STATES PATENT OFFICE 2,157,963

RETRACTABLE LANDING GEAR FOR AIRPLANES

Jean Mercier, Paris, France

Application December 29, 1936, Serial No. 118,153
In Belgium February 24, 1936

2 Claims. (Cl. 244—102)

The present invention relates to retractable landing gears for airplanes.

There exist retractable landing gears in which the interconnection between the wheel and the fixed body of the aircraft is ensured on the one hand by a quadrilateral, for instance a parallelogram, pivoted to the chassis or body in question, and on the other hand by a strut pivoted to the same elements.

The object of the present invention is to provide a landing gear of this kind which is better adapted to meet the requirements of practice, especially from the point of view of the space occupied by the device and its safety and facility of operation.

According to an essential feature of the present invention, the strut above mentioned is made of two elements pivoted to each other, so that said strut is foldable, which permits of reducing the distance between the landing gear in the retracted position and the pivoting axis of said strut, whereby the volume occupied by the landing gear in the retracted position is greatly reduced.

In known devices, the retraction of the landing gear is performed by means of a jack the body of which is pivoted to the body of the aircraft and the movable head of which is pivoted to the strut at some distance from its pivoting axis.

This arrangement has the disadvantage that the leverage of the torque producing the retraction of the gear varies with the angle described, and, in particular, is substantially maximum at the beginning of the angular movement, when the effort to be exerted is maximum. Furthermore, the torque can act only inside an angle smaller than 180°, from the lower dead center to the upper dead center.

Another feature of the landing gear according to the present invention consists in connecting the head of the jack no longer with the strut itself, but with the pivoting connection of two connecting rods the outer ends of which are respectively pivoted to the strut and to the body of the aircraft. In the course of the retracting movement, this jointed system is developed in such manner that, by suitably choosing the relative length of the connecting rods and the positions of the pivoting axes, it is possible to obtain a leverage, that is to say a lifting action, which is substantially constant, and a pivoting of the strut through an angle substantially greater than 180°.

Other features of the present invention will result from the following detailed description of a specific embodiment thereof.

A preferred embodiment of the present invention will be hereinafter described, with reference to the accompanying drawing, given merely by way of example, and in which:

The only figure diagrammatically shows a landing gear made according to the present invention, both in the lowered position (solid lines) and in the retracted position (dotted lines).

The landing gear shown in the drawing includes a wheel 1 carried by a stub axle 2 rigid with a rod or bar 3 substantially parallel to the plane of the wheel. The stub axle is pivotally connected at 4 with a strut 5 provided, in the known manner with a shock absorbing element 5' and itself pivoted to the frame of the aircraft at 6. Bar 3 is further connected to the aircraft body through two connecting rods 7 and 8 pivoted at 9 and 10 to bar 3 and at 11 and 12 to the aircraft body, in such manner as to constitute a deformable quadrilateral.

According to the present invention, the strut is made of two elements 5a and 5b, pivoted to each other about an axis 13 located below the longitudinal axis of the strut, so as to normally resist the stresses transmitted to the landing gear in the expanded position and, on the contrary, to fold up when the upper element 5a is swung upwardly.

It is clearly visible in the drawing that, owing to this joint 13, the whole of the landing gear will retract in the inside of fuselage 14, by moving toward axis 6 when element 5a is pivoted upwardly about said axis.

The lifting action is obtained, in the usual manner by means of a jack the body 15 of which is pivoted at 16 to the aircraft body and the head of which acts upon strut element 5a. However, according to an important feature of the present invention, this head 17, instead of being directly pivoted to the strut element, is pivoted at 18 to the axis about which two small connecting rods 19 and 20 are articulated together. The other respective ends of said small connecting rods are themselves pivoted to the aircraft body at 21 and to the strut element 5a at 22.

It results clearly from the drawing that, owing to this arrangement, head 17, instead of describing a circular arc having its center at 6, moves along a circular arc having its center at 18; the law of displacement depending upon the position of axes 21 and 22 and the relative lengths of the connecting rods, so that it is possible to obtain a leverage which is substantially constant. Furthermore, the jack will be capable of acting after strut element 5a has come substantially into line with axes 16 and 6, whereby its limits of action are widened.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In connection with an aircraft having a body, a retractable landing gear which comprises, in combination, a landing member, a folding structure for supporting said landing member including a strut element pivoted to said body, two connecting rods pivoted to each other and further pivoted one to said body and the other to said strut element, the four pivoting points of said strut element with said body, of the second mentioned connecting rod with said strut element, of said connecting rods with each other, and of the first mentioned connecting rod with said body, forming in the expanded position of the landing gear the apexes of a convex quadrilateral, two adjacent sides of which are constituted by said respective connecting rods, the sum of these two last mentioned sides being greater than the sum of the two other sides, and a jack for controlling the pivoting of said strut element, said jack being located wholly on the outside of said quadrilateral and including two parts movable with respect to each other, one of said parts being pivoted to said body and the other to the point of articulation of said two connecting rods with each other, said jack being arranged to be retracted when the landing gear is expanded and to cause the retracting of the landing gear by expanding.

2. In connection with an aircraft having a body, a retractable landing gear which comprises, in combination, a landing member, a folding structure for supporting said landing member including a strut element pivoted to said body, two connecting rods pivoted to each other and further pivoted one to said body and the other to said strut element, the four pivoting points respectively, of said strut element with said body, of said second mentioned connecting rod with said strut element, of both of said connecting rods with each other, and of said first mentioned connecting rod with said body, forming, in the expanded position of the landing gear, the apexes of a convex quadrilateral, two adjacent sides of which are constituted by said connecting rods and have the sum of their lengths greater than the sum of the two other sides of said quadrilateral, the second mentioned pivoting point being, in said expanded position of the landing gear, located below the first and the third mentioned pivoting point being, in said expanded position, located below both the second and the fourth, and a jack for controlling the pivoting of said strut element, said jack being made of at least two parts movable with respect to each other, one of said two last mentioned parts being pivoted to said third mentioned pivoting point and the other part being pivoted to a point of said body always located below said third mentioned pivoting point, said jack being retracted when the landing gear is in the expanded position.

JEAN MERCIER.